(12) United States Patent
Wishart (10) Patent No.: US 11,462,979 B2
(45) Date of Patent: Oct. 4, 2022

(54) COUNTER-ROTATING AXIAL ELECTRIC MOTOR ASSEMBLY

(71) Applicant: CR FLIGHT L.L.C., Carmichael, CA (US)

(72) Inventor: Randell J. Wishart, Reno, NV (US)

(73) Assignee: CR FLIGHT L.L.C., Carmichael, CA (US)

( * ) Notice: Subject to any disclaimer, the term of this patent is extended or adjusted under 35 U.S.C. 154(b) by 0 days.

(21) Appl. No.: 17/501,630

(22) Filed: Oct. 14, 2021

(65) Prior Publication Data
US 2022/0140710 A1    May 5, 2022

Related U.S. Application Data

(63) Continuation of application No. PCT/US2020/029064, filed on Apr. 21, 2020.

(60) Provisional application No. 62/837,549, filed on Apr. 23, 2019.

(51) Int. Cl.
| | | |
|---|---|---|
| *H02K 16/00* | (2006.01) | |
| *B64C 11/48* | (2006.01) | |
| *B64D 27/24* | (2006.01) | |
| *H02K 7/00* | (2006.01) | |
| *H02K 13/00* | (2006.01) | |

(52) U.S. Cl.
CPC ............ *H02K 16/005* (2013.01); *B64C 11/48* (2013.01); *B64D 27/24* (2013.01); *H02K 7/003* (2013.01); *H02K 13/003* (2013.01)

(58) Field of Classification Search
CPC ...... B64D 27/24; B64C 11/48; H02K 13/003; H02K 7/003; H02K 16/005

USPC ........................................................ 310/46
See application file for complete search history.

(56) References Cited

U.S. PATENT DOCUMENTS

| | | | |
|---|---|---|---|
| 4,056,746 | A | 11/1977 | Burtis |
| 4,259,604 | A | 3/1981 | Aoki |
| 10,116,187 | B1 | 10/2018 | Wishart |
| 2011/0025066 | A1 | 2/2011 | Cipriani |
| 2012/0045334 | A1 | 2/2012 | Bouru |
| 2012/0126541 | A1 | 5/2012 | Meller |

FOREIGN PATENT DOCUMENTS

| | | |
|---|---|---|
| CN | 102047529 A | 5/2011 |
| CN | 203632515 U | 6/2014 |
| CN | 107040087 A | 8/2017 |
| JP | S63217968 A | 9/1988 |
| JP | H09323698 | 12/1997 |
| JP | 2003143820 | 5/2003 |

(Continued)

OTHER PUBLICATIONS

ISA/US, United States Patent and Trademark Office (USPTO), international search report and written opinion dated Jul. 9, 2020, related PCT international application No. PCT/US2020/029064, pp. 1-11, claims searched, pp. 12-16.

(Continued)

*Primary Examiner* — Terrance L Kenerly
(74) *Attorney, Agent, or Firm* — O'Banion & Ritchey LLP; James M. Ritchey (57) ABSTRACT

A counter-rotating (CR) axial electric motor assembly is presented, with two oppositely rotating drive members, that is utilized to power any device that has traditionally employed an electric motor to supply rotational power.

8 Claims, 7 Drawing Sheets

(56) References Cited

FOREIGN PATENT DOCUMENTS

| JP | 2009292439 | A | | 12/2009 | |
|---|---|---|---|---|---|
| WO | WO-0074206 | A2 | * | 12/2000 | ............ H02K 16/005 |
| WO | 2018106611 | A1 | | 6/2018 | |
| WO | 2018070965 | A3 | | 9/2018 | |
| WO | 2020219415 | A1 | | 10/2020 | |

OTHER PUBLICATIONS

Canadian Intellectual Property Office (CIPO), examination report dated Jan. 25, 2022, related Canadian patent application No. 3,133,364, pp. 1-5, claims examined, pp. 6-10.

IP Australia, Examination Report No. 1 dated Dec. 22, 2022, related Australian patent application No. 2020262873, pp. 1-5, claims examined, 6-10.

State Intellectual Property Office of the People's Republic of China, The First Office Action dated Mar. 18, 2022, related Chinese patent application No. 202080019067.3, Chinese-language examination document, pp. 1-8, English-language translation thereof, pp. 9-18, Chinese-langusge search report, pp. 19-21, English anguage translation thereof, pp. 22-25, claims examined, pp. 26-30.

Korean Intellectual Property Office (KIPO), notification of reason for refusal dated Mar. 22, 2022, related Korean application No. 10-2021-7029717, pp. 1-5, English-language translation, 6-11, claims examined, pp. 3-16.

Korean Intellectual Property Office (KIPO), notice of final rejection dated Jul. 4, 2022, related Korean application No. 10-2021-7029717, pp. 1-5, English-language translation, pp. 6-9, claims examined, pp. 10-12.

Japan Patent Office (JPO), official action dated May 31, 2022, related Japanese patent application No. 2021-555468, Japanese-language document, pp. 1-4, English-language translation, pp. 5-7, claims examined, pp. 8-12.

State Intellectual Property Office of the People's Republic of China, The Second Office Action dated Jul. 29, 2022, related Chinese patent application No. 202080019067.3, Chinese-language examination document, pp. 1-9, English-language translation thereof, pp. 10-11, claims examined, pp. 12-15.

* cited by examiner

FIG. 5

COUNTER-ROTATING AXIAL ELECTRIC MOTOR ASSEMBLY

CROSS-REFERENCE TO RELATED APPLICATIONS

This application claims priority to, and is a 35 U.S.C. § 111(a) continuation of, PCT international application number PCT/US2020/029064 filed on Apr. 21, 2020, incorporated herein by reference in its entirety, which claims priority to, and the benefit of, U.S. provisional patent application Ser. No. 62/837,549 filed on Apr. 23, 2019, incorporated herein by reference in its entirety. Priority is claimed to each of the foregoing applications.

The above-referenced PCT international application was published as PCT International Publication No. WO 2020/219415 A1 on Oct. 29, 2020, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a counter-rotating (CR) axial electric motor assembly. Most standard motor containing devices may be outfitted with the subject CR axial electric motor assembly taking the place of the standard electric motor. A common use for the subject technology is for powering an aircraft or for air-movement/fan technologies and the examples given below are directed to these applications for illustrative purposes only and not by way of limitation. More specifically, the subject invention is a CR axial electric motor assembly that is often utilized to power horizontal flight and vertical take-off and landing aircraft or air circulation fans and permits two associated propellers to rotate very close to one another about a common central axis, wherein the airflow generated by one propeller is differentially coupled into the rotation of the other propeller, thereby increasing the efficiency of power consumption by the CR axial motor over an equivalent standard/traditional motor that rotates a single propeller.

2. Background Discussion

To distinguish between an axial motor and a radial motor it is noted that a standard/traditional axial motor has the magnetic flux running parallel to the rotating output shaft, while a standard/traditional radial motor has the magnetic flux running perpendicular the rotating output shaft.

For a traditional brush-containing DC radial motor, the outside/surrounding motor housing is stationary, as is the stator/field magnets within the housing. Normally, the stator is usually affixed to the housing. An internal armature/rotor is attached to a shaft or axel that rotates during operation (in some versions of a standard motor the rotor may be termed the armature). Thus, the armature shaft/axel extends out from the stationary motor housing and rotates when electrical current is applied to the motor (the armature/rotor rotates within the stationary stator/field magnets). In brush-containing motors, physical brushes are required to transmit the electricity from the outside source to the rotor via a commutator interfacing that pulses the current to alternate the field polarity in the coils of the armature, thereby generating the rotational driving force used to turn the armature. The history of traditional brush-containing electric motors is extensive.

For a traditional brushless DC radial motor, the outside/surrounding motor housing is, again, stationary, as is the stator within the housing. Normally, the stator is usually affixed to the housing. An internal armature/rotor is attached to a shaft or axel that rotates during operation. Thus, the armature shaft/axel extends out from the stationary motor housing and rotates when electrical current is applied to the motor (the armature/rotor rotates within the stationary stator/field magnets). In brushless motors, physical brushes are not required to transmit the electricity from the outside source to the rotor. The configuration of brushless motors permits either a design utilizing permanent magnets affixed to the stator or, more commonly, the permanent magnets are associated with the armature and the field winding are located in the stationary stator. Clearly, brushless motors do not use physical brushes for commutation; instead, they are electronically commutated by standard techniques. Suitably pulsed currents are delivered to the windings and timed via incorporated means such as standard Hall Effect sensors/magnets, back emf, and equivalent means. Brushless DC motors have many well-known advantages over brush-containing motors.

A counter-rotating electric DC radial motor is described in related U.S. Pat. Nos. 2,431,255, 2,456,993, and 2,462,182. The disclosed motor was to be used in torpedo propulsion systems in which a coaxial propeller assembly drove separate propellers in opposite directions to aid in keeping the torpedo traveling in a desired direction. Clearly, the operational lifetime of such a motor is extremely limited, given its destruction upon hitting a target. To eliminate necessary centrifugal/centripetal influenced commutator-to-brush contact breaks created while the stator is rotating (normally the stator is not rotating so a constant resilient means or spring simply forces a brush inward and towards the center of rotation, thereby contacting the commutator for the required electrical communication, but rotation of the stator causes the brushes to "float" away from the commutator), the device contained a "radial commutator" (a disk extending outwardly from the axis of rotation) and contact brushes directed parallel to the axis of rotation. This radial commutator/brush design is complex, not easily fabricated, and, thus, expensive to manufacture.

In U.S. Pat. No. 3,738,270 a brushless electric DC radial motor for a torpedo is disclosed. To maintain stability during its course in water to its target, oppositely rotating propellers are beneficial. The design utilizes a stationary stator around which two independent armatures rotate in opposite directions to drive the associated propellers in corresponding opposite directions.

U.S. Pat. No. 4,056,746 presents a counter-rotation radial electric motor that is quite like the design presented immediately above. Once again a radial commutator/brush design is utilized in the operation of the device.

A DC rotary machine is related in U.S. Pat. No. 4,259,604. The commutator/brush design in this device is very simplistic and is not created to operate at high rotational velocities. Typically, the motor is used in a machine such as a tape recorder, VTR, and the like that need low rotational speeds. The commutator is of standard cylindrical design and the brushes are contacted in a permanent fashion against the commutator bars.

U.S. Pat. Nos. 8,198,773; 8,253,294; 8,531,072; and 10,116,187 (issued to the subject Applicant) are for various counter-rotating motor/generator applications.

Standard/traditional axial motors are well known, as illustrated at the site: https://www.magnax.com-blog/axial-flux-vs-radial-flux-for-direct-drive-gneerators. In the existing axial motors, only the rotor/armature rotates while the field coils are stationary and secured to the stator.

A suitable slip ring assembly for conveying in electrical current to any (axial or radial) CR motor is disclosed in International Publication WO 2018/106611 (by the subject Applicant) and is herein incorporated, in total, for reference, into this application.

BRIEF SUMMARY

An object of the technology described herein is to provide a CR axial electric motor assembly, with two oppositely rotating drive members, that is utilized to power any device that has traditionally utilized an electric motor to supply rotational power.

An object of the technology described herein is to provide a CR axial electric motor assembly, with two oppositely rotating drive members, that is utilized to power horizontal flight and vertical take-off and landing aircraft.

An additional object of the technology described herein is to provide a CR axial electric motor assembly, with two oppositely rotating drive members, that is utilized to power a fan for the movement or pumping of air or other liquid and gaseous substances.

Another object of the technology described herein is to furnish a CR axial electric motor assembly, with two oppositely rotating drive members, with each drive member having a propeller, that is utilized to power a fan for the movement or pumping of air or other liquid and gaseous substances.

A further object of the technology described herein is to supply a CR axial electric motor assembly that is utilized to power a fan for the movement or pumping of air or other liquid and gaseous substances with decreased electrical power input relative to mechanical power output when compared with a standard/traditional axial motor.

Still another object of the technology described herein is to disclose a CR axial electric motor assembly that is utilized to power horizontal flight and vertical take-off and landing aircraft with increased battery life and more thrust than an equivalent standard/traditional motor.

Still an additional object of the subject invention is to disclose a CR axial motor that utilizes a combination of 1) added energy not wasted to a traditional motor mount, 2) added energy due to lower heat production, and 3) synergistic differential coupling between the two oppositely rotating members to increase their net rotational velocities to increase the efficiency of the CR axial motor over a standard axial motor.

Disclosed is a CR axial electric motor assembly. For example, and not by way of limitation, such CR axial motors may be utilized to power an aircraft vehicle or fan that comprises: a) a counter rotating differential axial electric motor with two oppositely rotating members, wherein a first rotating member includes one or more sets of permanent magnets and a second rotating member includes one or more sets of electromagnetic field windings; b) a first set of propeller blades secured to one of the oppositely rotating member and a second set of propeller blades secured to the other set of oppositely rotating propeller blades; c) means for carrying electricity to the electromagnetic field coils; d) means for mounting the CR axial motor assembly to the vehicle or fan; e) optionally, the control means for operating the CR motor assembly; f) and optionally, the electric power supply.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only.

DETAILED DESCRIPTION

Referring more specifically to the drawings, for illustrative purposes the subject technology is embodied in the system generally shown in FIG. 1 through FIG. 5. It will be appreciated that the subject system CR axial electric motor assembly may vary as to configuration and as to details of the components, and that the method may vary as to the specific steps and sequence of operation, without departing from the basic concepts as disclosed herein.

Generally, the subject invention is a CR axial electric motor assembly. For exemplary purposes only, one usage is frequently to power an aircraft vehicle or a fan/pump for moving a gas or a liquid, therefore these types of applications utilize associated propellers or impellers. Generally, the subject invention comprises a CR axial electric motor assembly that includes: a central shaft having a long axis with first and second ends and a short axis perpendicular to said long axis; a base member to which the central shaft first end is mated; a first rotational member mounted by first bearings to permit rotation around the central shaft's long axis and secured to a set of electromagnetic field coils having each field coil's magnetic field running approximately parallel to the long axis of the central shaft; a second rotational member mounted by second bearings to permit rotation around the central shaft's long axis and shaft secured to at least one set of permanent magnets having each magnet's magnetic field running approximately parallel to the long axis of the central shaft; a first drive member attached to and extending from the first rotational member; a second drive member attached to and extending from the second rotational member, wherein the first and second drive members rotate in opposite directions when electric current is applied to the electromagnetic field coils; and a slip ring assembly secured about the central shaft proximate the first end and the base member, wherein the slip ring assembly facilitates passage of the electric current from an outside power source to the electromagnetic field coils while the first and second drive members rotate in opposite directions. Additionally, the subject CR axial motor may further comprise a first propeller with two or more blades attached to the first drive member and a second propeller with two of more blades attached to the second drive member, wherein the first and second propeller blades have their pitches selected to force a surrounding medium to be moved in a common direction past the CR axial motor. Further, the subject CR axial electric motor may have the central shaft is fixed in a stationary manner to the base member and the first and second rotational members rotate in opposite directions around the stationary shaft or the central shaft is hollow and affixed to the first rotational member and is rotationally mounted to the base member and the second rotational member rotates in an opposite direction to the central hollow shaft and the first rotational member.

Also, the CR axial electric motor assembly may comprise: a central shaft having a long axis with first and second ends and a short axis perpendicular to the long axis; a base member to which the central shaft first end is non-rotationally mounted; a first rotational member, comprising: a support sleeve encircling the non-rotating central shaft; first bearings mounted to the support sleeve that permit the support sleeve to rotated around the central shaft; a support disc attached to and extending away from the central shaft, approximately parallel to the central shaft's short axis; a set of electromagnetic field coils secured to the support disc in a pattern surrounding the central shaft with each field coil's magnetic field running approximately parallel to the central shaft's long axis; a second rotational member, comprising; a support housing encircling the non-rotating central shaft having opposing first and second side walls approximately parallel to the central shaft's short axis, wherein the second side wall has an aperture centered about the central shaft's long axis and sufficiently large to accommodate wires running from a slip ring assembly to the electromagnetic field coils; second bearings mounted to the support housing first side wall that permit the support housing to rotated around the central shaft; at least one set of permanent magnets secured to the same support housing side wall in a pattern surrounding the central shaft with each permanent magnet's magnetic field running approximately parallel to the central shaft's long axis; a first drive member attached to and extending from the first rotational member; a second drive member attached to and extending from the second rotational member, wherein the first and second drive members rotate in opposite directions when electric current is applied to the electromagnetic field coils; and the slip ring assembly secured about the central shaft proximate the first end and the base member, wherein the slip ring assembly facilitates passage of the electric current from an outside power source to the electromagnetic field coils while the first and second drive members rotate in opposite directions. Further comprising the subject CR axial motor is a first propeller with two or more blades attached to the first drive member and a second propeller with two of more blades attached to the second drive member, wherein the first and second propeller blades have their pitches selected to force a surrounding medium to be moved in a common direction past the CR axial motor.

Additionally, the subject CR axial electric motor assembly may comprise: a central hollow shaft having a long axis with first and second ends and a short axis perpendicular to the long axis; a base member; first bearings mounted to the base member into which the central hollow shaft first end rotationally mounts;

a. a first rotational member, comprising:
  i. a support disc attached to and extending away from the central hollow shaft, approximately parallel to the central shaft's short axis;
  ii. a set of electromagnetic field coils secured to the support disc in a pattern surrounding the central hollow shaft with each field coil's magnetic field running approximately parallel to the central shaft's long axis;
b. a second rotational member, comprising;
  i. a support housing encircling the central hollow shaft with two opposing side walls approximately parallel to the central shaft's short;
  ii. second bearings mounted to the support housing that permit the support housing to rotated around the central hollow shaft;
  iii. at least one set of permanent magnets secured to the same support housing side wall in a pattern surrounding the central hollow shaft with each permanent magnet's magnetic field running approximately parallel to the central shaft's long axis;
c. a first drive member attachment region located proximate the central hollow shaft second end;
d. a second drive member attached to and extending from the second rotational member, wherein the first drive member attachment region and the second drive member rotate in opposite directions when electric current is applied to the electromagnetic field coils; and
e. a slip ring assembly secured about the central shaft proximate the first end and the base member, wherein the slip ring assembly facilitates passage of the electric current from an outside power source to the electromagnetic field coils, via wires passing through the central hollow shaft, while the first and second rotational members rotate in opposite directions.

Additionally, the subject CR axial electric motor assembly may further comprise a first propeller with two or more blades attached to the first drive member attachment region and a second propeller with two of more blades attached to the second drive member, wherein the first and second propeller blades have their pitches selected to force a surrounding medium to be moved in a common direction past the CR axial motor.

It is pointed out that several slightly differing embodiments of the subject invention exist: 1) a CR axial motor assembly with a stationary central shaft (FIGS. 1A with two sets of permanent magnets and 1B with one set of permanent magnets) and 2) a CR axial motor assembly with a rotating central shaft (FIGS. 2A with two sets of permanent magnets and 2B with one set of permanent magnets), both are discussed in detail below. Many components are identical between the two embodiments. However, clearly, some suspension elements are rearranged from one to the other to permit two oppositely rotating members to rotate. Further, the electro-mechanical means for creating rotational force comprises permanent magnets and electromagnets, however, if desired, electromagnets may replace the permanent magnets and the physical locations of each type of magnet may be reversed. For exemplary purposes only, and not by way of limitation, permanent magnets in combination with electromagnets are utilized in the subject examples.

Figure 1A:
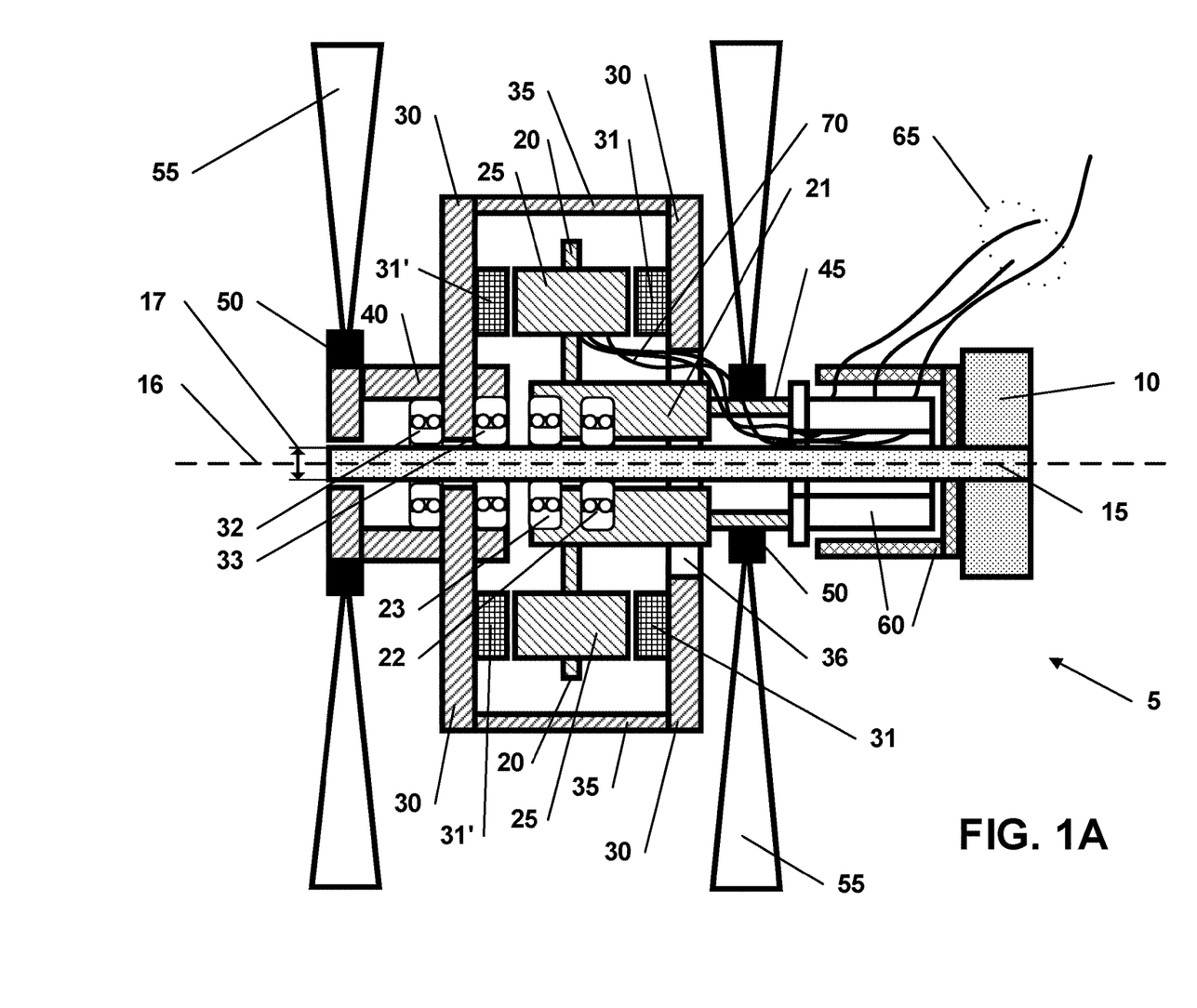
FIG. 1A is a cross-sectional view of an embodiment of the subject invention that utilizes a stationary central shaft with oppositely rotating drive members exiting on opposite sides of the magnetic field generation region and two sets of permanent magnets.

As shown in FIG. 1, a first embodiment of the subject invention comprises a CR axial motor 5 in which a base member 10 is non-rotationally secured to a central shaft 15. Usually, the base 10 and central shaft are fabricated from a metal of metal alloy, however, natural and synthetic polymers, ceramics, glass, and equivalent material are contemplated to be within the realm of this disclosure. Further, the bas 10 and central shaft may be fabricated as a single unit. The central shaft 15 has a long axis 16 with first and second ends and a perpendicular short axis 17. The shaft first end is non-rotationally affixed (either permanently or removably) to the base 10 by standard means such as gluing, set screws, screwing, welding, brazing, soldering, and the like.

The remainder of the components of subject invention will be configured around the central shaft either in a rotational or non-rotational manner. A first rotational member is mounted by first bearings 22 and 23 to the central shaft 15 around its long axis 16. The first rotation member comprises a support disc 20 attached to and extending away from a support sleeve 21 that encircles the non-rotating central shaft 15 and is approximately parallel to the central shaft's short axis 17. Bearings 22 and 23 rotationally secure the support sleeve 21 to the central shaft 15. Normally, the support sleeve 21 and support disc 20 are fabricated from a suitable metal of metal alloy, however, natural and synthetic polymers, ceramics, glass, and equivalent material are contemplated to be within the realm of this disclosure.

Mounted into the support disc are a set of electromagnetic field coils 25. The set of field coils 25 are arranged in a pattern that circles the central shaft 15 and are displaced radially outward proximate the middle to outer perimeter edge of the support disc 20. The selected number of field coils within each set of included field coils 15 depends on the size (how many will physically fit with the circumference of the support disc 20 and provide a desired field density) of the specific CR axial motor. The magnetic field or flux for each field coil 25 runs approximately parallel to the central shaft's 15 long axis 16. The field coils 25 are secured to the support disc 20 by standard attachment means. In the exemplary figures (FIGS. 1A, 1B, 2A, and 2B), the exemplary field coils are configured in a three-phase arrangement (three wires 70 or 170 enter the field coils 25, but other phase arrangements are contemplated to be within the realm of this disclosure). During operation of the CR axial motor the field coils 25, support sleeve 21, and attached support disc 20 all rotate around the central shaft 15 in a first direction.

A second rotational member is mounted by second bearings 32 and 33 to the central shaft 15 around its long axis 16. The second rotation member comprises a support housing 30 that encircles the non-rotating central shaft 15. The support housing 30 has two opposing side walls that are approximately parallel to the central shaft short axis 17 and extend radially outward from the central shaft 15. Connecting the outer perimeter of the support housing 30 side walls is an end member 35. One side of the side walls of the support housing 30 has an aperture 36 centered about the central shaft's 15 long axis 16 and is sufficiently large in diameter to accommodate wires 70 running from a slip ring assembly 60 to the electromagnetic field coils 25. The second bearings 32 and 33 permit the support housing 30 to rotate around the central shaft 15 when the CR axial motor is operating.

Figure 1B:
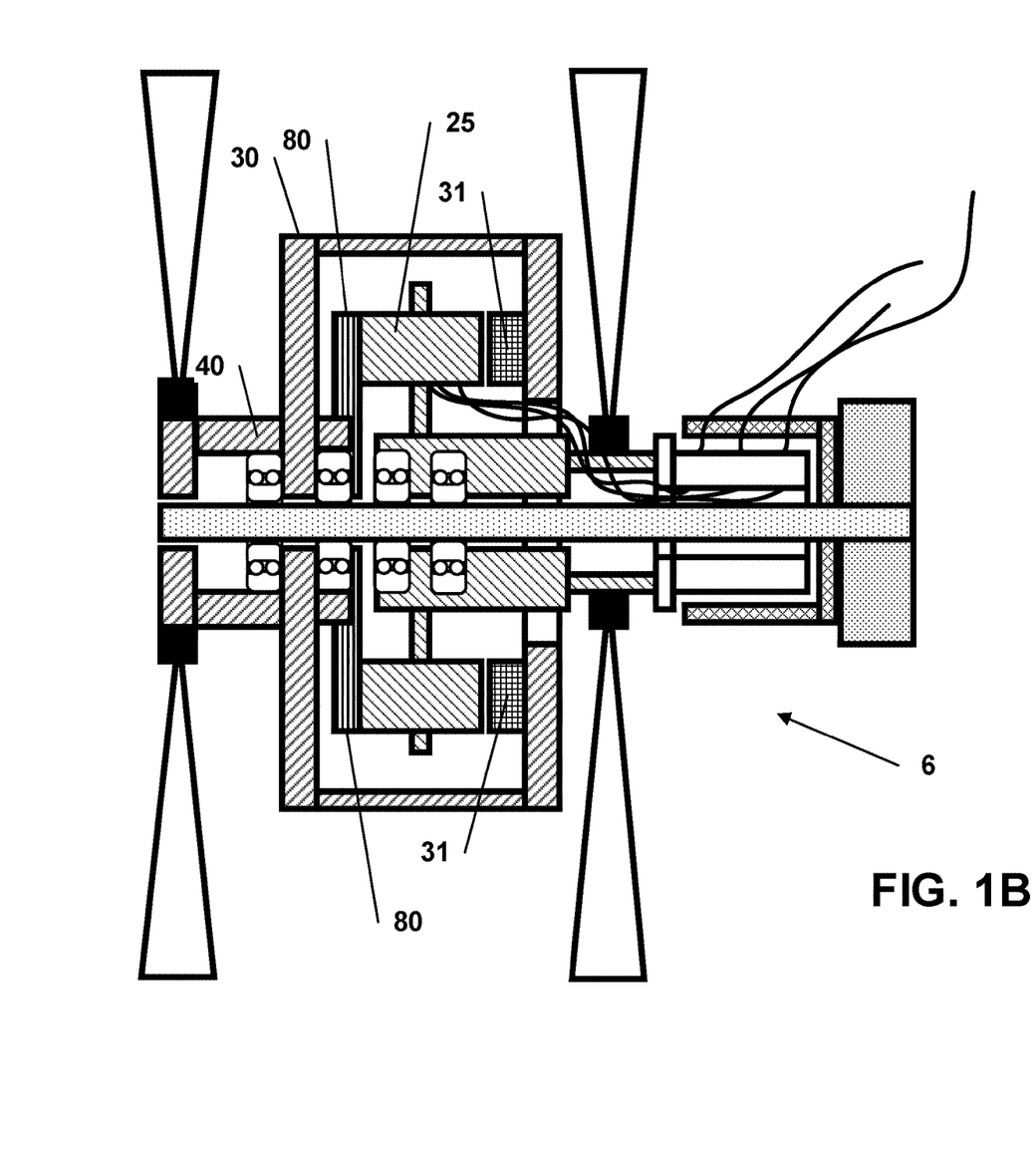
FIG. 1B is a cross-sectional view of another embodiment of the subject invention that utilizes a stationary central shaft with oppositely rotating drive members exiting on opposite sides of the magnetic field generation region and a single set of permanent magnets.
Figure 5:
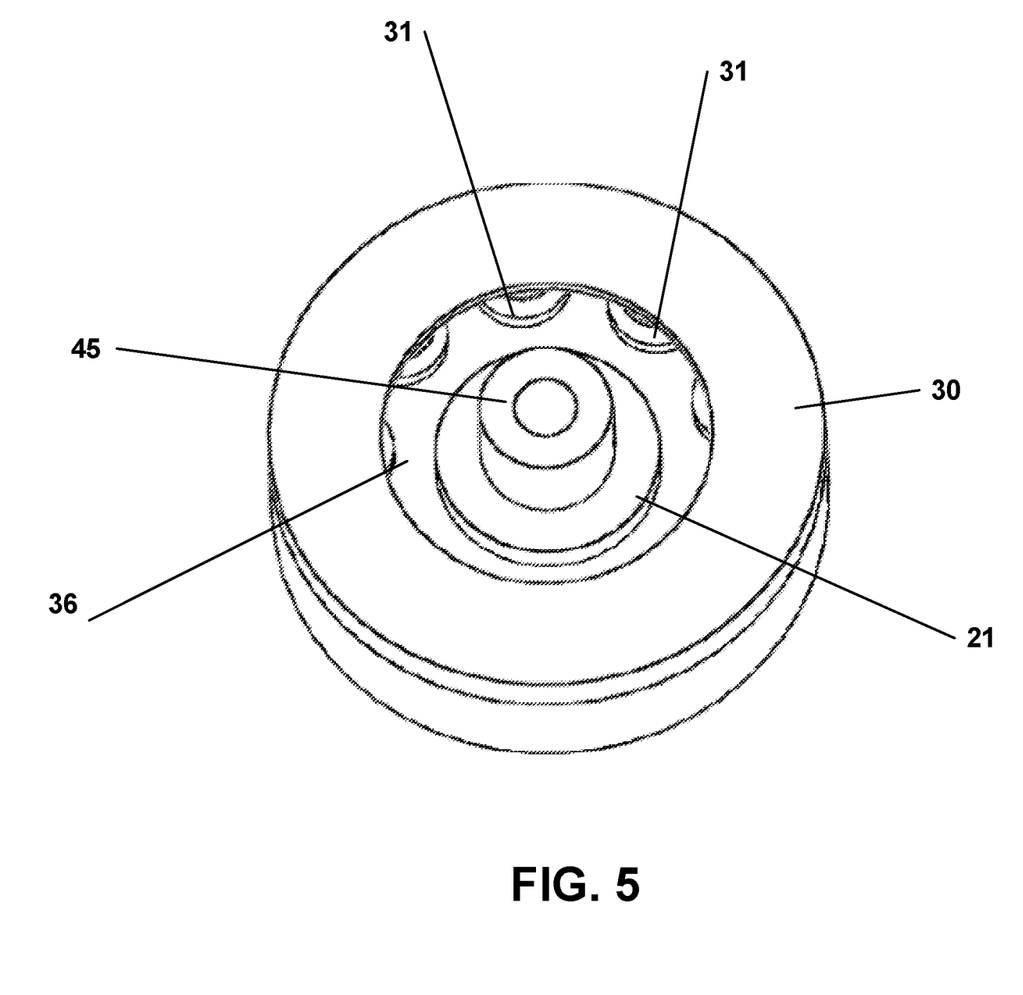
FIG. 5 is a perspective drawing showing the orientation of one set of permanent magnets on the first rotational member.

Affixed to the inside surface of the support housing is at least one set of permanent magnets 31 (first set) and 31' (second set). The permanent magnets 31 and 31' are secured by suitable means such as gluing and the like. Each set of permanent magnets 31 and 31' are arranged in a circular pattern. FIG. 5 shows the circular arrangement of the permanent magnets 31 within the support housing 30. It is pointed out that FIG. 1A shows two sets of permanent magnets 31 and 31', while FIG. 1B is an embodiment that depicts only one set of permanent magnets 31. Each permanent magnet's magnetic field runs approximately parallel to the central shaft's 15 long axis 16, thereby, in conjunction with the electromagnetics 31 and 31' produce the force necessary to drive the CR axial motor.

A first drive member 45 is attached to and extends from (along the long axis 16 of the central shaft 15) the first rotational member's support sleeve 21 and surrounds the central shaft 15. This first drive member 45 serves as an attachment point for coupling the CR axial motor to an external usage means. In the exemplary and depicted external usage means a propeller mount 50 couples with a propeller blade 55.

A second drive member 40 is attached to and extends from (along the long axis 16 of the central shaft 15 in an opposite direction to the first drive member 45) the second rotational member's support housing 30. When electric current is applied to the electromagnetic field coils during operation of the CR axial motor, the first and second drive members rotate in opposite directions.

An alternative embodiment to the subject CR axial motor depicted in FIG. 1A (CR axial motor 5) is the one shown in FIG. 1B (CR axial motor 6). The two embodiments a very similar (same numbered elements), except CR axial motor 6 has only one set of permanent magnets 31 and not two sets on the support housing 30 side walls. A circular plate 80 is connected to one side of the field coils/windings 25. This version simplifies fabrication of the CR axial motor 6.

Figure 2A:
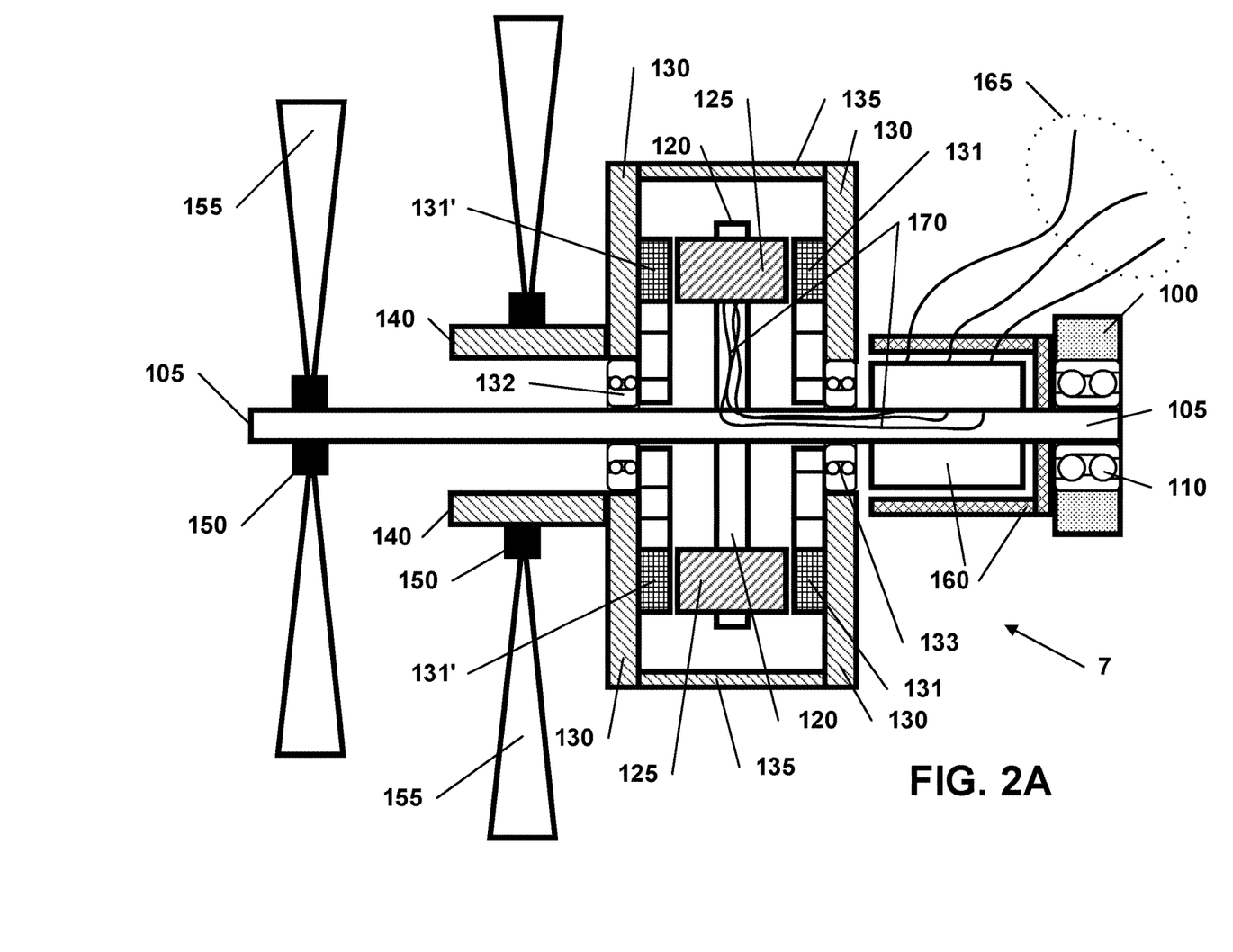
FIG. 2A is a cross-sectional view of yet another embodiment of the subject invention that utilized a rotating central shaft with oppositely rotating drive members that extend out from the same side of the magnetic field generation region and two sets of permanent magnets.
Figure 2B:
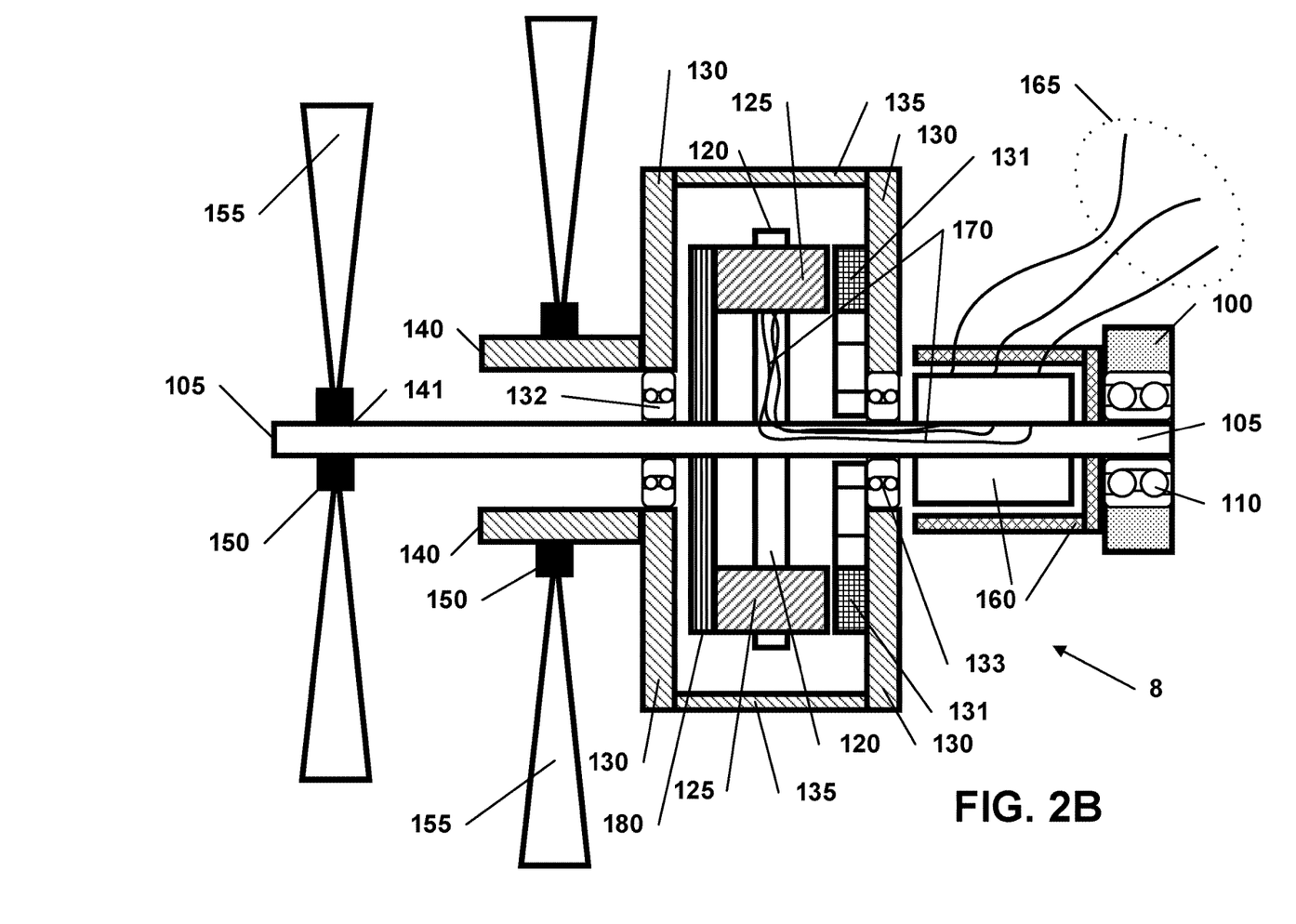
FIG. 2B is a cross-sectional view of still another embodiment of the subject invention that utilized a rotating central shaft with oppositely rotating drive members that extend out from the same side of the magnetic field generation region and a single set of permanent magnets.

FIGS. 2A and 2B depict two more embodiments (CR axial motors 7 and 8) of the subject invention. Instead of having the stationary central shaft 15, they have a hollow and rotating central shaft 105 that is mounted proximate its first end by bearings 110 into the base member 100. The hollow shaft 105 permits wires 170 from the slip ring assembly 160 to travel through the hollow interior of the shaft 105 and on to the electromagnetic coils/windings 125.

The first rotational member comprises a support disc 120 that may be hollow (wires 170 traveling inside it) or solid (wires 170 traveling outside it). A plurality of field coils/windings 125 are placed in a pattern (usually circular and centered on the central shaft 105).

The second rotational member is mounted by two sets of bearings 132 and 133 on the central shaft 105 and comprises a support housing 130, with two opposing side walls, and an end member 135 that extends between the two support housing 130 side walls. Embodiment 7 has two sets of permanent magnets 131 and 131' mounted on the inside surfaces of the support housing 130 opposing side walls.

A first drive member attachment region 141 is located proximate the central shaft's 105 second end. Propeller attachment couplers 150 are secured to the central shaft 105 at the attachment regions 141 and extend into propeller blades 155.

A second drive member 140 is attaches to and extends from the support housing 130. The second drive member 140 is generally of cylindrical form and is secured to propeller attachment couplers 150 and into propeller blades 155.

FIG. 2B shows only one set of permanent magnets 31 and not two sets, on the support housing 130 side walls. A circular plate 180 is connected to one side of the field coils/windings 125. This version simplifies fabrication of the CR axial motor 8.

Generally, the electricity carrying means (external power source to internal field coils) utilizes wiring that supplies the field coils/windings with electricity. Depending on the configuration of the field coils/windings, one or more wires may communicate with the field coils/windings. Three wires (three phase configuration, but other equivalent wiring configuration are contemplated to be within the realm of this disclosure) are depicted for exemplary purposes and run from the field coils/windings to a slip ring assembly and then on to a suitable power supply. Besides slip ring assembles, other equivalent electricity carrying means may be utilized, including, but not limited to, electrically conductive bearings and the like.

As mentioned above, a suitable slip ring assembly for conveying in electrical current to any (axial or radial) CR motor (or other rotational electrical device) is disclosed in International Publication WO 2018/106611 (by the subject Applicant) and is herein incorporated, in total, for reference, into this application. For clarity, a general configuration for a suitable slip ring assembly is depicted in FIGS. 3 and 4.

Specifically, the electricity carrying means shown in all the exemplary drawings (FIGS. 1A-4 and 6-11) is a slip ring assembly 60 that is secured about the central shaft 15 proximate the first end and the base member 10. A typical slip ring assembly 60/160 is shown in FIG. 3 and a variation slip ring assembly 60'/160' having an oil/lubricant chamber 310 and oil/lubricant reservoir 300 is depicted in FIG. 4.

Figure 3:
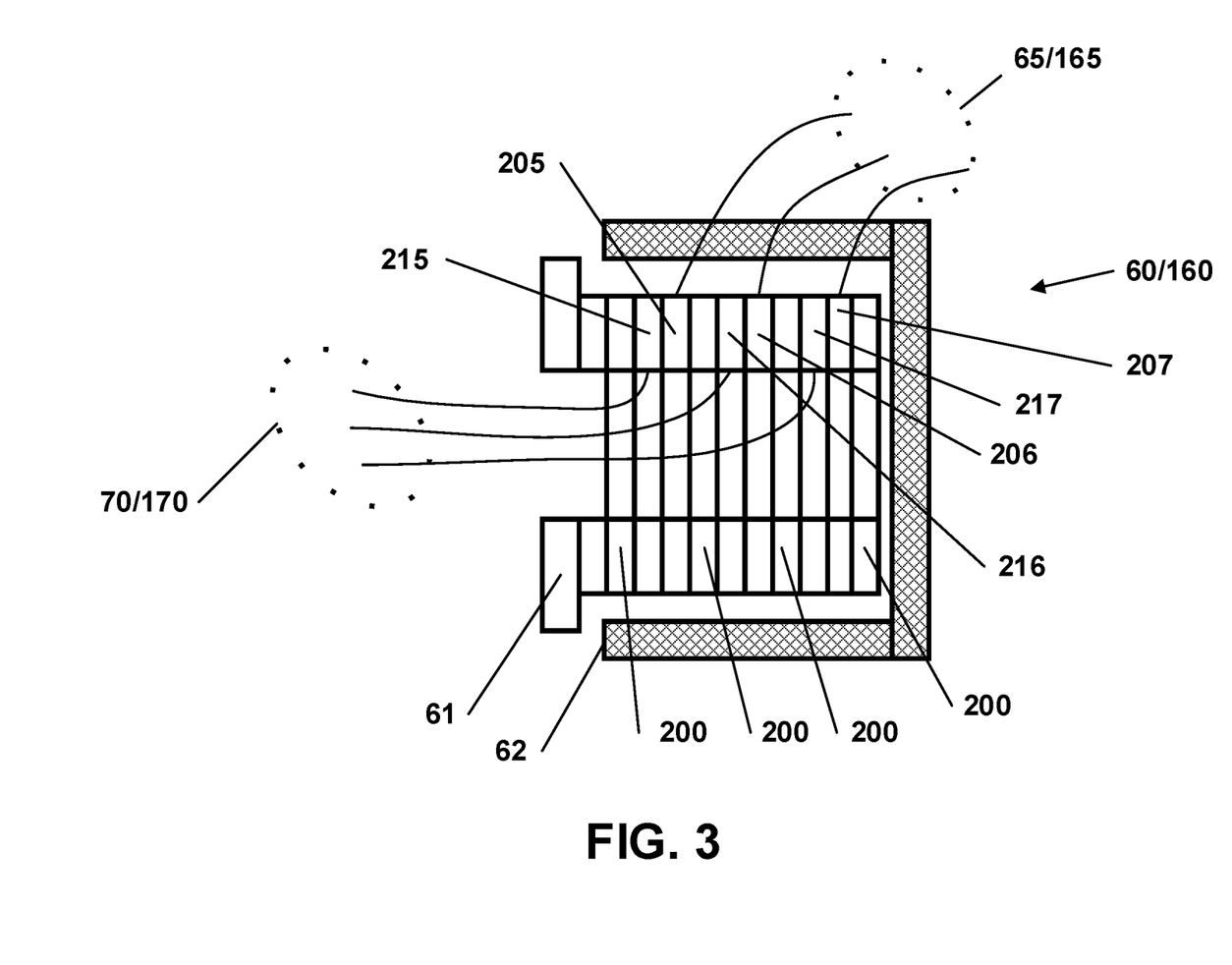
FIG. 3 is a cross-sectional view of an exemplary slip ring assembly that is capable of transmitting electricity from an outside power source to the inside field coils.

The slip ring assembly 60/160 version shown in FIG. 3 assumes a three phase CR axial motor, but can be modified for any phase configuration. The slip ring assembly 60/160 comprises a set of incoming wires 65/165 (from an external power source) that travel through a surrounding housing 62 by suitable apertures. An internal spindle 61 comprises a series of either electrically conducting or electrically insulating discs. The electrically insulating discs 200 isolate the incoming phases from grounding out. There are entering (from a power source) electrically conducting discs 205, 206, and 207 secured to wires 65/165 and exiting (to the field coils) electrically conducting discs 215, 216, and 217 secured to wires 70/170. Conducting discs 205 rotates on 215, 206 rotates on 216, and 207 on 217. Applicant has discovered (see International Publication WO 2018/106611) that when either one or both paired entering and exiting discs are fabricated from sintered/porous material, that contains an oil/lubricant, that large amounts of power (high voltages and currents) may be transmitted during slow to rapid rotations without noticeable wear to the discs. A suitable sintered/porous material is Oilite (sintered bronze that is available from many standard sources) and the like.

Figure 4:
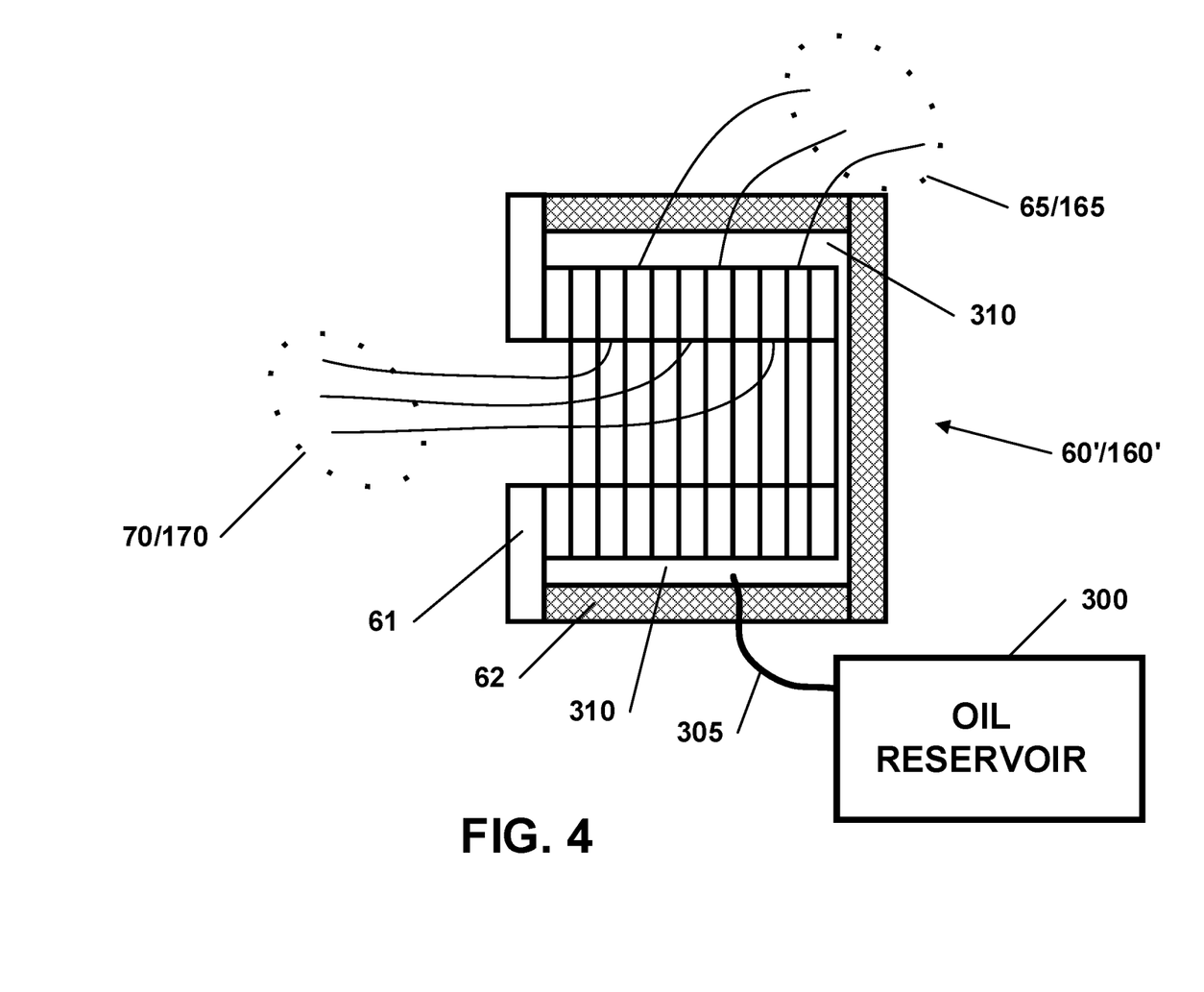
FIG. 4 is a cross-sectional view of an exemplary slip ring assembly that is capable of transmitting electricity from an outside power source to the inside field coils and includes an oil/lubricant reservoir and line or wick to carry the oil/lubricant into the discs of the slip ring assembly.

The slip ring assembly 60'/160' version shown in FIG. 4 comprises the various components shown for slip ring assembly 60/160 except here there is an additional oil/lubricant chamber 310 and oil/lubricant reservoir 300. In some applications additional oil/lubricant may be beneficial. Here the spindle 61 mates with the housing 62 to create the oil lubricant chamber 310 and oil/lubricant reservoir. In some application the chamber 310 may be sufficient for additional oil/lubricant, but in other cases additional oil/lubricant may be needed and supplied from the reservoir 300 via a supply line or wick 305.

A power source is utilized to supply a suitable amount of electricity (specific CR axial motor-determined amperage and voltage levels) to the CR axial motor assembly. Additionally, a standard and easily purchased electronic speed controller (ESC) is employed to control the incoming electricity to actuate the field coil windings in a pattern that creates the necessary magnetic repulsive forces to power rotation and to initiate rotation.

For the exemplary CR axial motor fabricated to power an aircraft or fan, the differential or first-to-second propeller-feed-back action of the subject invention helps explain a portion of the effectiveness or efficiency of the subject invention which has two internally differentially-coupled propellers compared with a traditional/standard motor outfitted with only a single propeller. The set of blades on the first propeller encounters oncoming air and increases the velocity of the leaving air. The set of blades on the second propeller (switched in pitch from the first propeller to drive the surrounding medium in the same direction) encounters the first propeller-accelerated air which causes the second rotational member to rotate faster, which in turn further accelerates the first rotational member and the internally differentially coupled two rotational members operate with a higher efficiency than a motor with only one propeller that provides no synergistic feed-back enhancement between rotational members, as is seen for the CR axial version.

Experimental

For experimental trials and illustrative purposes only, and not by way of limitation, a CR axial drone electrical motor assembly was fabricated. If either rotational member is stopped the CR axial motor, then operates as a traditional/standard axial motor with only one rotating member. Each drive member is secured to a propeller with one propeller having its pitch opposite to the other propeller so that the surrounding air is directed in a common direction past the CR axial motor assembly.

Experiment #1:

These tests were conducted with three different types of motors coupled to equal propellers: 1) a standard motor from RC Timer (5010-620KV, found at rctimer.com and most hoppy supply stores) with one propeller; 2) a CR axial motor that is approximately the same size as the standard RC Timer motor (5010-620KV) with one propeller held stationary (this mimics a standard motor); and 3) a CR axial motor that is approximately the same size as the standard RC Timer motor (5010-620KV) with two oppositely spinning propellers. All runs were at 22° C. for the room temperature.

If we select 22.3 volts and 16.00 amps for both the CR axial motor with only one propeller spinning (the other is held fixed) versus both propellers spinning in opposite directions, the CR axial with both propellers is ~24% more efficient when comparing motor efficiency in grams per watt (g/W). It is stressed that the protype CR axial motor that was tested was hand-made and will, undoubtedly, become more efficient by applying machine-made tolerances.

Several embodiments of the subject technology are contemplated to be within the realm of this disclosure and include a CR axial electric motor assembly, comprising: a central shaft having a long axis with first and second ends and a short axis perpendicular to the long axis; a base member to which the central shaft first end is mated; a first rotational member mounted by first bearings to permit rotation around the central shaft's long axis and secured to a set of electromagnetic field coils having each field coil's magnetic field running approximately parallel to the long axis of the central shaft; a second rotational member mounted by second bearings to permit rotation around the central shaft's long axis and shaft secured to at least one set of permanent magnets having each magnet's magnetic field running approximately parallel to the long axis of the central shaft; a first drive member attached to and extending from the first rotational member; a second drive member attached to and extending from the second rotational member, wherein the first and second drive members rotate in opposite directions when electric current is applied to the electromagnetic field coils; and a slip ring assembly secured about the central shaft proximate the first end and the base member, wherein the slip ring assembly facilitates passage of the electric current from an outside power source to the electromagnetic field coils while the first and second drive members rotate in opposite directions.

An additional embodiment further includes a first propeller with two or more blades attached to the first drive member and a second propeller with two of more blades attached to the second drive member, wherein the first and second propeller blades have their pitches selected to force a surrounding medium to be moved in a common direction past the CR axial motor.

Another embodiment has a central shaft that is fixed in a stationary manner to the base member and the first and second rotational members rotate in opposite directions around the stationary shaft.

Yet another embodiment has a central shaft that is hollow and affixed to the first rotational member and is rotationally mounted to the base member and the second rotational member rotates in an opposite direction to the central hollow shaft and the first rotational member.

Still a further embodiment is a CR axial electric motor assembly, comprising: a central shaft having a long axis with first and second ends and a short axis perpendicular to the long axis; a base member to which the central shaft first end is non-rotationally mounted; a first rotational member, comprising: a support sleeve encircling the non-rotating central shaft; first bearings mounted to the support sleeve that permit the support sleeve to rotated around the central shaft; a support disc attached to and extending away from the support sleeve, approximately parallel to the central shaft's short axis; a set of electromagnetic field coils secured to the support disc in a pattern surrounding the central shaft with each field coil's magnetic field running approximately parallel to the central shaft's long axis; a second rotational member, comprising; a support housing encircling the non-rotating central shaft having opposing first and second side walls approximately parallel to the central shaft's short axis, wherein the second side wall has an aperture centered about the central shaft's long axis and sufficiently large to accommodate wires running from a slip ring assembly to the electromagnetic field coils; second bearings mounted to the support housing first side wall that permit the support housing to rotated around the central shaft; at least one set of permanent magnets secured to the same support housing side wall in a pattern surrounding the central shaft with each permanent magnet's magnetic field running approximately parallel to the central shaft's long axis; a first drive member attached to and extending from the first rotational member; a second drive member attached to and extending from the second rotational member, wherein the first and second drive members rotate in opposite directions when electric current is applied to the electromagnetic field coils; and the slip ring assembly secured about the central shaft proximate the first end and the base member, wherein the slip ring assembly facilitates passage of the electric current from an outside power source to the electromagnetic field coils while the first and second drive members rotate in opposite directions.

Still yet another embodiment includes adding a first propeller with two or more blades attached to the first drive member and a second propeller with two of more blades attached to the second drive member, wherein the first and second propeller blades have their pitches selected to force a surrounding medium to be moved in a common direction past the CR axial motor.

One more embodiment is a CR axial electric motor assembly, comprising: a central hollow shaft having a long axis with first and second ends and a short axis perpendicular to the long axis; a base member; first bearings mounted to the base member into which the central hollow shaft first end rotationally mounts; a first rotational member, comprising: a support disc attached to and extending away from the central hollow shaft, approximately parallel to the central shaft's short axis; a set of electromagnetic field coils secured to the support disc in a pattern surrounding the central hollow shaft with each field coil's magnetic field running approximately parallel to the central shaft's long axis; a second rotational member, comprising; a support housing encircling the central hollow shaft with two opposing side walls approximately parallel to the central shaft's short; second bearings mounted to the support housing that permit the support housing to rotated around the central hollow shaft; at least one set of permanent magnets secured to the same support housing side wall in a pattern surrounding the central hollow shaft with each permanent magnet's magnetic field running approximately parallel to the central shaft's long axis; a first drive member attachment region located proximate the central hollow shaft second end; a second drive member attached to and extending from the second rotational member, wherein the first drive member attachment region and the second drive member rotate in opposite directions when electric current is applied to the electromagnetic field coils; and a slip ring assembly secured about the central shaft proximate the first end and the base member, wherein the slip ring assembly facilitates passage of the electric current from an outside power source to the electromagnetic field coils, via wires passing through the central hollow shaft, while the first and second rotational members rotate in opposite directions.

Lastly, an embodiment may further comprise a first propeller with two or more blades attached to the first drive member attachment region and a second propeller with two of more blades attached to the second drive member, wherein the first and second propeller blades have their pitches selected to force a surrounding medium to be moved in a common direction past the CR axial motor.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. A counter-rotating (CR) axial electric motor assembly, comprising: (a) a central shaft having a long axis with first and second ends and a short axis perpendicular to said long axis; (b) a base member to which said central shaft first end is mated; (c) a first rotational member mounted by first bearings to permit rotation around said central shaft's long axis and secured to a set of electromagnetic field coils having each field coil's magnetic field running approximately parallel to said long axis of said central shaft; (d) a second rotational member mounted by second bearings to permit rotation around said central shaft's long axis and shaft secured to at least one set of permanent magnets having each magnet's magnetic field running approximately parallel to said long axis of said central shaft; (e) a first drive member attached to and extending from said first rotational member; (f) a second drive member attached to and extending from said second rotational member, wherein said first and second drive members rotate in opposite directions when electric current is applied to said electromagnetic field coils; and (g) a slip ring assembly secured about said central shaft proximate said first end and said base member, wherein said slip ring assembly facilitates passage of said electric current from an outside power source to said electromagnetic field coils while said first and second drive members rotate in opposite directions.

2. The CR axial motor according to any preceding or following embodiment, further comprising a first propeller with two or more blades attached to said first drive member and a second propeller with two of more blades attached to said second drive member, wherein said first and second propeller blades have their pitches selected to force a surrounding medium to be moved in a common direction past the CR axial motor.

3. The CR axial electric motor according to any preceding or following embodiment, wherein said central shaft is fixed in a stationary manner to said base member and said first and second rotational members rotate in opposite directions around said stationary shaft.

4. The CR axial electric motor according to any preceding or following embodiment, wherein said central shaft is hollow and affixed to said first rotational member and is rotationally mounted to said base member and said second rotational member rotates in an opposite direction to said central hollow shaft and said first rotational member.

5. A CR axial electric motor assembly, comprising: (a) a central shaft having a long axis with first and second ends and a short axis perpendicular to said long axis; (b) a base member to which said central shaft first end is non-rotationally mounted; (c) a first rotational member, comprising: (i) a support sleeve encircling said non-rotating central shaft; (ii) first bearings mounted to said support sleeve that permit said support sleeve to rotated around said central shaft; (iii) a support disc attached to and extending away from said support sleeve, approximately parallel to said central shaft's short axis; (iv) a set of electromagnetic field coils secured to said support disc in a pattern surrounding said central shaft with each field coil's magnetic field running approximately parallel to said central shaft's long axis; (d) a second rotational member, comprising; (i) a support housing encircling said non-rotating central shaft having opposing first and second side walls approximately parallel to said central shaft's short axis, wherein said second side wall has an aperture centered about said central shaft's long axis and sufficiently large to accommodate wires running from a slip ring assembly to said electromagnetic field coils; (ii) second bearings mounted to said support housing first side wall that permit said support housing to rotated around said central shaft; (iii) at least one set of permanent magnets secured to said same support housing side wall in a pattern surrounding said central shaft with each permanent magnet's magnetic field running approximately parallel to said central shaft's long axis; (e) a first drive member attached to and extending from said first rotational member; (f) a second drive member attached to and extending from said second rotational member, wherein said first and second drive members rotate in opposite directions when electric current is applied to said electromagnetic field coils; and (g) said slip ring assembly secured about said central shaft proximate said first end and said base member, wherein said slip ring assembly facilitates passage of said electric current from an outside power source to said electromagnetic field coils while said first and second drive members rotate in opposite directions.

6. The CR axial motor according to any preceding or following embodiment, further comprising a first propeller with two or more blades attached to said first drive member and a second propeller with two of more blades attached to said second drive member, wherein said first and second propeller blades have their pitches selected to force a surrounding medium to be moved in a common direction past the CR axial motor.

7. A CR axial electric motor assembly, comprising: (a) a central hollow shaft having a long axis with first and second ends and a short axis perpendicular to said long axis; (b) a base member; (c) first bearings mounted to said base member into which said central hollow shaft first end rotationally mounts; (d) a first rotational member, comprising: (i) a support disc attached to and extending away from said central hollow shaft, approximately parallel to said central shaft's short axis; (ii) a set of electromagnetic field coils secured to said support disc in a pattern surrounding said central hollow shaft with each field coil's magnetic field running approximately parallel to said central shaft's long axis; (e) a second rotational member, comprising; (iii) a support housing encircling said central hollow shaft with two opposing side walls approximately parallel to said central shaft's short axis; (iv) second bearings mounted to said support housing that permit said support housing to rotated around said central hollow shaft; (v) at least one set of permanent magnets secured to said same support housing side wall in a pattern surrounding said central hollow shaft with each permanent magnet's magnetic field running approximately parallel to said central shaft's long axis; (f) a first drive member attachment region located proximate said central hollow shaft second end; (g) a second drive member attached to and extending from said second rotational member, wherein said first drive member attachment region and said second drive member rotate in opposite directions when electric current is applied to said electromagnetic field coils; and (h) a slip ring assembly secured about said central shaft proximate said first end and said base member, wherein said slip ring assembly facilitates passage of said electric current from an outside power source to said electromagnetic field coils, via wires passing through said central hollow shaft, while said first and second rotational members rotate in opposite directions.

8. The CR axial motor according to any preceding or following embodiment, further comprising a first propeller with two or more blades attached to said first drive member attachment region and a second propeller with two of more blades attached to said second drive member, wherein said first and second propeller blades have their pitches selected to force a surrounding medium to be moved in a common direction past the CR axial motor.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE #1

RC Timer Motor with One Propeller

| VOLTAGE (VOLTS) | CURRENT (AMPS) | INPUT POWER (WATTS) | OUTPUT THRUST (POUNDS) | MOTOR MAX. TEMP. (° C.) | MOTOR EFF. (g/W) |
|---|---|---|---|---|---|
| 22.3 | 8.50 | 189.5 | 2.10 | 34.0 | 5.0 |
| 22.3 | 14.00 | 312.2 | 2.94 | 55.0 | 4.3 |
| 22.3 | 16.00 | 356.8 | 3.12 | 69.0 | 4.0 |
| 22.3 | 18.00 | 401.4 | 3.42 | 82.0 | 3.9 |
| 22.3 | 20.00 | 446.0 | 3.62 | 87.0 | 3.7 |
| 30.0 | 8.50 | 255.0 | 2.66 | 47.0 | 4.7 |
| 30.0 | 11.00 | 330.0 | 3.18 | 65.0 | 4.4 |
| 30.0 | 16.00 | 480.0 | 3.76 | 94.0 | 3.6 |

TABLE #2

CR Axial Motor with ONE Propeller (other prop held fixed)

| VOLTAGE (VOLTS) | CURRENT (AMPS) | INPUT POWER (WATTS) | OUTPUT THRUST (POUNDS) | MOTOR MAX. TEMP. (° C.) | MOTOR EFF. (g/W) |
|---|---|---|---|---|---|
| 22.3 | 8.50 | 189.5 | 2.34 | 100 | 5.6 |
| 22.3 | 11.00 | 245.3 | 2.68 | 100 | 5.0 |
| 22.3 | 13.00 | 289.9 | 2.94 | 100 | 4.6 |
| 22.3 | 16.00 | 356.8 | 3.34 | 100 | 4.2 |

TABLE #3

CR Axial Motor with TWO Propellers

| VOLTAGE (VOLTS) | CURRENT (AMPS) | INPUT POWER (WATTS) | OUTPUT THRUST (POUNDS) | MOTOR MAX. TEMP. (° C.) | MOTOR EFF. (g/W) |
|---|---|---|---|---|---|
| 22.3 | 8.50 | 189.5 | 2.40 | 37.0 | 5.7 |
| 22.3 | 14.00 | 312.2 | 3.74 | 46.0 | 5.4 |
| 22.3 | 16.00 | 356.8 | 4.12 | 49.0 | 5.2 |
| 22.3 | 18.00 | 401.4 | 4.34 | 53.0 | 4.9 |
| 22.3 | 20.00 | 446.0 | 4.82 | 76.0 | 4.9 |
| 30.0 | 8.50 | 255.0 | 2.66 | 47.0 | 4.7 |
| 30.0 | 11.00 | 330.0 | 3.18 | 65.0 | 4.4 |
| 30.0 | 16.00 | 480.0 | 3.76 | 94.0 | 3.6 |

What is claimed is:

1. A counter-rotating (CR) axial electric motor assembly, comprising:
   a. a central shaft having a long axis with first and second ends and a short axis perpendicular to said long axis;
   b. a base member to which said central shaft first end is mated;
   c. a first rotational member mounted by first bearings to permit rotation around said central shaft's long axis and secured to a set of electromagnetic field coils having each field coil's magnetic field running approximately parallel to said long axis of said central shaft;
   d. a second rotational member mounted by second bearings to permit rotation around said central shaft's long axis and shaft secured to at least one set of permanent magnets having each magnet's magnetic field running approximately parallel to said long axis of said central shaft;
   e. a first drive member attached to and extending from said first rotational member;
   f. a second drive member attached to and extending from said second rotational member, wherein said first and second drive members rotate in opposite directions when electric current is applied to said electromagnetic field coils; and
   g. a slip ring assembly secured about said central shaft proximate said first end and said base member, wherein said slip ring assembly comprises discs that are fabricated from sintered/porous material, that contains an oil/lubricant and facilitates passage of said electric current from an outside power source to said electromagnetic field coils while said first and second drive members rotate in opposite directions.

2. The CR axial motor according to claim 1, further comprising a first propeller with two or more blades attached to said first drive member and a second propeller with two of more blades attached to said second drive member, wherein said first and second propeller blades have their pitches selected to force a surrounding medium to be moved in a common direction past the CR axial motor.

3. The CR axial electric motor according to claim 1, wherein said central shaft is fixed in a stationary manner to said base member and said first and second rotational members rotate in opposite directions around said stationary shaft.

4. A counter-rotating (CR) axial electric motor assembly, comprising:
   a. a central shaft having a long axis with first and second ends and a short axis perpendicular to said long axis;
   b. a base member to which said central shaft first end is mated;
   c. a first rotational member mounted by first bearings to permit rotation around said central shaft's long axis and secured to a set of electromagnetic field coils having each field coil's magnetic field running approximately parallel to said long axis of said central shaft;
   d. a second rotational member mounted by second bearings to permit rotation around said central shaft's long axis and shaft secured to at least one set of permanent magnets having each magnet's magnetic field running approximately parallel to said long axis of said central shaft;
   e. a first drive member attached to and extending from said first rotational member;
   f. a second drive member attached to and extending from said second rotational member, wherein said first and second drive members rotate in opposite directions when electric current is applied to said electromagnetic field coils; and
   g. a slip ring assembly secured about said central shaft proximate said first end and said base member, wherein said slip ring assembly facilitates passage of said electric current from an outside power source to said electromagnetic field coils while said first and second drive members rotate in opposite directions, wherein said central shaft is hollow and affixed to said first rotational member and is rotationally mounted to said base member and said second rotational member rotates in an opposite direction to said central hollow shaft and said first rotational member.

5. A CR axial electric motor assembly, comprising:
   a. a central shaft having a long axis with first and second ends and a short axis perpendicular to said long axis;
   b. a base member to which said central shaft first end is non-rotationally mounted;
   c. a first rotational member, comprising:
      i. a support sleeve encircling said non-rotating central shaft;
      ii. first bearings mounted to said support sleeve that permit said support sleeve to rotated around said central shaft;
      iii. a support disc attached to and extending away from said support sleeve, approximately parallel to said central shaft's short axis;
      iv. a set of electromagnetic field coils secured to said support disc in a pattern surrounding said central shaft with each field coil's magnetic field running approximately parallel to said central shaft's long axis;
   d. a second rotational member, comprising:
      i. a support housing encircling said non-rotating central shaft having opposing first and second side walls approximately parallel to said central shaft's short axis, wherein said second side wall has an aperture centered about said central shaft's long axis and sufficiently large to accommodate wires running from a slip ring assembly to said electromagnetic field coils;
      ii. second bearings mounted to said support housing first side wall that permit said support housing to rotated around said central shaft;
      iii. at least one set of permanent magnets secured to said same support housing side wall in a pattern surrounding said central shaft with each permanent magnet's magnetic field running approximately parallel to said central shaft's long axis;
   e. a first drive member attached to and extending from said first rotational member;
   f. a second drive member attached to and extending from said second rotational member, wherein said first and second drive members rotate in opposite directions when electric current is applied to said electromagnetic field coils; and
   g. said slip ring assembly secured about said central shaft proximate said first end and said base member, wherein said slip ring assembly facilitates passage of said electric current from an outside power source to said electromagnetic field coils while said first and second drive members rotate in opposite directions.

6. The CR axial motor according to claim 5, further comprising a first propeller with two or more blades attached to said first drive member and a second propeller with two of more blades attached to said second drive member, wherein said first and second propeller blades have their pitches selected to force a surrounding medium to be moved in a common direction past the CR axial motor.

7. A CR axial electric motor assembly, comprising:
   a. a central hollow shaft having a long axis with first and second ends and a short axis perpendicular to said long axis;
   b. a base member;
   c. first bearings mounted to said base member into which said central hollow shaft first end rotationally mounts;
   d. a first rotational member, comprising:
      i. a support disc attached to and extending away from said central hollow shaft, approximately parallel to said central shaft's short axis;
      ii. a set of electromagnetic field coils secured to said support disc in a pattern surrounding said central hollow shaft with each field coil's magnetic field running approximately parallel to said central shaft's long axis;
   e. a second rotational member, comprising;
      iii. a support housing encircling said central hollow shaft with two opposing side walls approximately parallel to said central shaft's short axis;
      iv. second bearings mounted to said support housing that permit said support housing to rotated around said central hollow shaft;
      v. at least one set of permanent magnets secured to said same support housing side wall in a pattern surrounding said central hollow shaft with each permanent magnet's magnetic field running approximately parallel to said central shaft's long axis;
   f. a first drive member attachment region located proximate said central hollow shaft second end;

g. a second drive member attached to and extending from said second rotational member, wherein said first drive member attachment region and said second drive member rotate in opposite directions when electric current is applied to said electromagnetic field coils; and h. a slip ring assembly secured about said central shaft proximate said first end and said base member, wherein said slip ring assembly facilitates passage of said electric current from an outside power source to said electromagnetic field coils, via wires passing through said central hollow shaft, while said first and second rotational members rotate in opposite directions.

8. The CR axial motor according to claim 7, further comprising a first propeller with two or more blades attached to said first drive member attachment region and a second propeller with two of more blades attached to said second drive member, wherein said first and second propeller blades have their pitches selected to force a surrounding medium to be moved in a common direction past the CR axial motor.

\* \* \* \* \*